United States Patent
Fiedel et al.

(10) Patent No.: US 10,789,544 B2
(45) Date of Patent: Sep. 29, 2020

(54) BATCHING INPUTS TO A MACHINE LEARNING MODEL

(71) Applicant: Google LLC, Mountain View, CA (US)

(72) Inventors: Noah Fiedel, Palo Alto, CA (US); Christopher Olston, Los Altos, CA (US); Jeremiah Harmsen, San Jose, CA (US)

(73) Assignee: Google LLC

( * ) Notice: Subject to any disclaimer, the term of this patent is extended or adjusted under 35 U.S.C. 154(b) by 715 days.

(21) Appl. No.: 15/091,381

(22) Filed: Apr. 5, 2016

(65) Prior Publication Data
US 2017/0286864 A1 Oct. 5, 2017

(51) Int. Cl.
*G06N 20/00* (2019.01)
*G06F 9/54* (2006.01)

(52) U.S. Cl.
CPC ............ *G06N 20/00* (2019.01); *G06F 9/546* (2013.01); *G06F 2209/548* (2013.01)

(58) Field of Classification Search
CPC ........ G06N 99/00; G06N 99/005; G06N 5/00; G06N 20/00; G06F 9/3851; G06F 9/46; G06F 9/5038; G06F 17/30; G06F 15/16; G06F 9/546; G06F 2209/548; H04L 29/06; H04L 29/08072
See application file for complete search history.

(56) References Cited

U.S. PATENT DOCUMENTS

| | | | |
|---|---|---|---|
| 7,765,549 B1* | 7/2010 | Lauer | G06F 9/5005 707/705 |
| 8,538,030 B1* | 9/2013 | Belenko | G06F 21/72 380/286 |
| 2002/0124241 A1* | 9/2002 | Grey | G06F 9/52 717/149 |
| 2005/0177414 A1* | 8/2005 | Priogin | G06Q 10/06 706/21 |
| 2012/0150886 A1* | 6/2012 | Kwiatkowski | G06F 17/30902 707/758 |

(Continued)

OTHER PUBLICATIONS

Sun, Jimeng et al. "Incremental Tensor Analysis: Theory and Applications" 2008 [Online] Downloaded Jan. 30, 2020 https://dl.acm.org/doi/pdf/10.1145/1409620.1409621?download=true (Year: 2008).*

(Continued)

*Primary Examiner* — Ben M Rifkin
(74) *Attorney, Agent, or Firm* — Fish & Richardson P.C.

(57) ABSTRACT

Methods, systems, and apparatus, including computer programs encoded on computer storage media, for batching inputs to machine learning models. One of the methods includes receiving a stream of requests, each request identifying a respective input for processing by a first machine learning model; adding the respective input from each request to a first queue of inputs for processing by the first machine learning model; determining, at a first time, that a count of inputs in the first queue as of the first time equals or exceeds a maximum batch size and, in response: generating a first batched input from the inputs in the queue as of the first time so that a count of inputs in the first batched input equals the maximum batch size, and providing the first batched input for processing by the first machine learning model.

20 Claims, 3 Drawing Sheets

(56) References Cited

U.S. PATENT DOCUMENTS

| | | | | |
|---|---|---|---|---|
| 2013/0339287 A1* | 12/2013 | Krause | ............... | G06N 5/025 |
| | | | | 706/47 |
| 2016/0019469 A1* | 1/2016 | Petrov | ............... | G06F 9/46 |
| | | | | 706/12 |
| 2017/0075693 A1* | 3/2017 | Bishop | ............... | G06F 9/5088 |

OTHER PUBLICATIONS

Kelly, PA. "Mechanics Lecture Notes: Foundaitons of Continum Mechanics, chapter 1.8 Tensors" Verified by Wayback Machine to 2018 [Online] Downloaded Jan. 30, 2020 http://homepages.engineering.auckland.ac.nz/~pkel015/SolidMechanicsBooks/Part_1I1/Chapter_1_Vectors_Tensors/Vectors_Tensors_08_Tensors.pdf (Year: 2013).*

Shi, Ziqiang et al. "Audio Segment Classifiaction using Online Learning Based Tensor Representation Feature Discrimination" 2013 [Online] Downloaded Jun. 23, 2020 https://ieeexplore.ieee.org/stamp/stamp.jsp?tp=&arnumber=6287558 (Year: 2013).*

Rich Brueckner, "Interview: Baidu Speeds Deep Learning with GPU Clusters," (Nov. 5, 2015) [online] (retrieved from http://insidehpc.com/2015/10/interview-baidu-speeds-deep-learning-with-gpu-clusters/), 5 pages.

Cade Metz, "Tensorflow, Google's Open Source AI, Signals Big Changes in Hardware Too," (Nov. 10, 2015) [online] (retrieved from http://www.wired.com/2015/11/googles-open-source-ai-tensorflow-signals-fast-changing-hardware-world/), 13 pages.

Abadi et al., "TensorFlow: Large-scale Machine Learning on Heterogeneous Distributed Systems," (2015) [online] (retrieved from http://download.tensorflow.org/paper/whitepaper2015.pdf), 19 pages.

Written Opinion issued in International Application No. PCT/US2016068090, dated Mar. 9, 2018, 7 pages.

International Search Report and Written Opinion in International Application No. PCT.US2016/068090, dated Mar. 7, 2017, 14 pages.

Anonymous: RTI Connect DDS Core Libraries User's Manual Version 5.2.0 (excerpt) Jun. 1, 2015, Retrieved from Internet: URL<https://community.rti.com/static/documentation/connext-dds/5.2.0/doc/manuals/connext_dds/RTI_ConnextDDS_CoreLibraries_UsersManual.pdf> [retrieved on Feb. 15, 2017], pp. 339-345.

* cited by examiner

BATCHING INPUTS TO A MACHINE LEARNING MODEL

BACKGROUND

This specification relates to processing inputs using a machine learning model.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network includes an output layer and one or more hidden layers that each apply a non-linear transformation to a received input to generate an output.

SUMMARY

In general, this specification describes a system for batching inputs to a machine learning model.

A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. By batching inputs to a machine learning model as described in this specification, the hardware resources used by a system to perform the operations of the model can be more effectively used while ensuring that a maximum acceptable latency is not exceeded. In particular, high-throughput hardware resources, e.g., graphics processing units (GPUs) and other hardware accelerators, can be optimized while maintaining an acceptable latency. In situations where the system maintains multiple machine learning models, inputs for each of those models can be batched effectively. By maintaining a respective queue for each of the multiple machine learning models, virtualization of the hardware accelerators available to the system for processing machine learning inputs can effectively be achieved.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a system that batches inputs to a machine learning model before the inputs are processed by the machine learning model.

Figure 1:
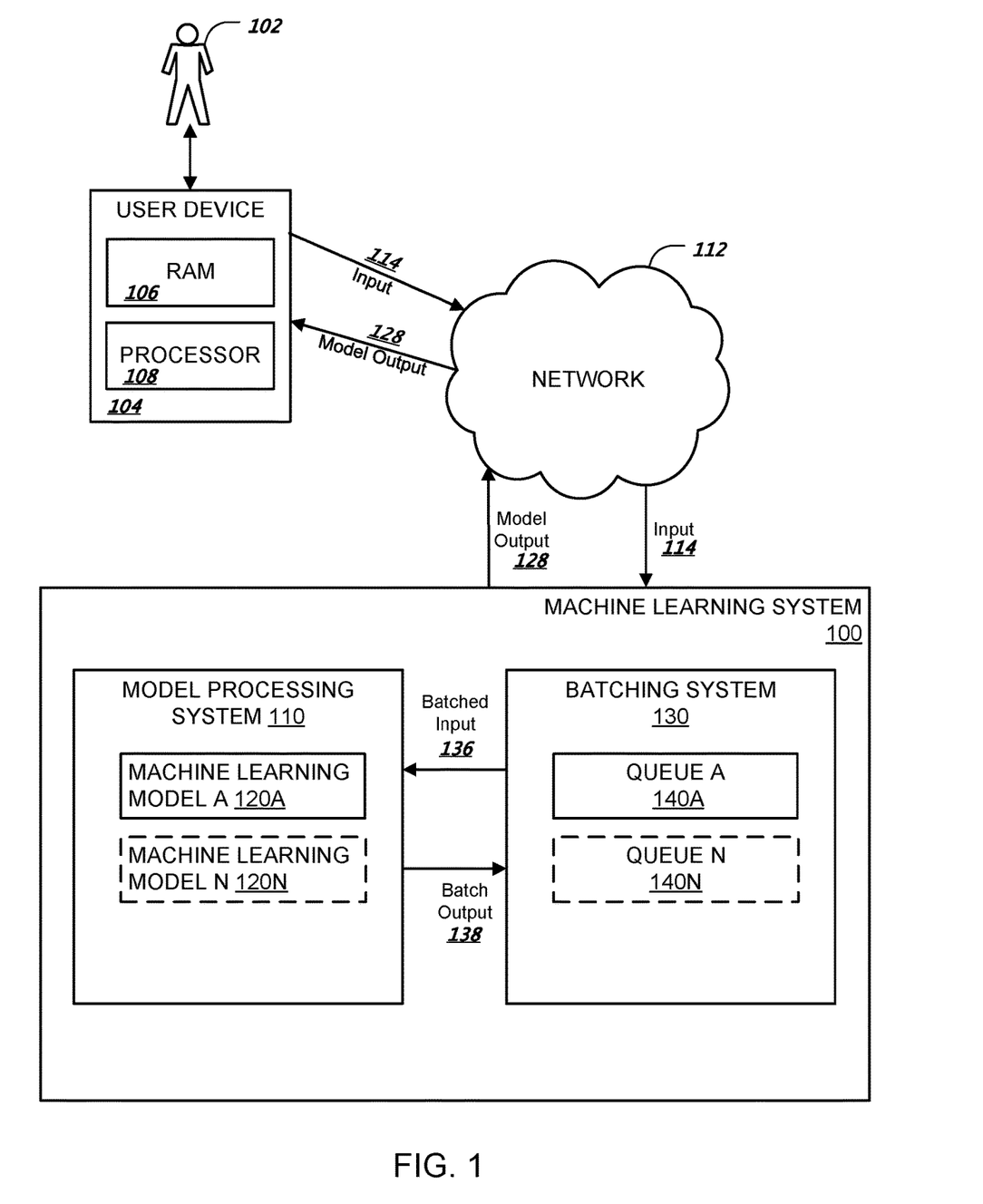
FIG. 1 illustrates an example machine learning system.

FIG. 1 illustrates an example machine learning system 100. The machine learning system 100 is an example of a system implemented as computer programs on one or more computers in one or more locations, in which the systems, components, and techniques described below can be implemented.

The machine learning system 100 is a system that provides model outputs generated by machine learning models in response to requests from users located remotely from the machine learning system 100.

For example, a user 102 of a user device 104 can submit a request to the machine learning system 100 that includes an input 114 to be processed by a machine learning model 120A over a data communication network 112, e.g., local area network (LAN) or wide area network (WAN), e.g., the Internet, or a combination of networks, any of which may include wireless links.

In response, the machine learning system 100 can generate a model output 128 for the input 114 by processing the input 114 using the machine learning model 120A and then provide the model output 128 as part of a response to the request.

Thus, the machine learning system 100 can allow users to make use of the predictive capability of the machine learning model 120A and any other machine learning models maintained by the machine learning system 100 without needing to make available local computing resources necessary to train and maintain the machine learning models or needing to have the knowhow required to train and maintain the machine learning models.

In particular, the machine learning system 100 includes a model processing system 110 that maintains the machine learning model 120A and, optionally, other machine learning models, e.g., a machine learning model 120N, for use in processing inputs received in requests submitted by users of the machine learning system 100.

In some implementations, the model processing system 110 is a system that represents the operations of a given maintained machine learning model as a computational graph that includes nodes connected by directed edges. Each node in the computational graph represents an operation. An incoming edge to a node represents a flow of an input into the node, i.e., an input to the operation represented by the node. An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node.

To process an input using the machine learning model, the model processing system 110 distributes the operations represented by the nodes in the graph across multiple devices and causes the devices to collectively process the input by performing the operations represented by the nodes.

Generally, a device is a hardware resource that performs operations independent of other devices. For example, each device can have its own processing unit. The devices can be Graphical Processing Units (GPUs) or Central Processing Units (CPUs). By way of illustration, one machine can host one or more devices, e.g., multiple CPUs and GPUs.

An example system that distributes operations represented by the nodes of a computational graph across multiple devices to process inputs to a machine learning model is described in TensorFlow: Large-Scale Machine Learning on Heterogeneous Distributed Systems, Martin Abadi, et al., available at tensorflow.org.

In order to optimize the use of the hardware resources, e.g., the devices, available to the model processing system 110, the model processing system 110 supports processing of batched inputs by each of the machine learning models maintained by the model processing system 110.

A batched input for a given machine learning model is a composition of multiple individual inputs on which at least some of the operations of the machine learning model are performed in parallel.

For example, if the machine learning model is a neural network that includes an operation in which a parameter matrix is multiplied by a layer input generated from a current input to the network as part of generating a layer output, the matrix multiplication can be performed in parallel for each individual input in a given batched input.

In some implementations, the machine learning model processes the batched input as a single input, i.e., all of the operations of the machine learning model are performed in parallel for the batched input.

By processing a batched input using a machine learning model, the model processing system 110 generates a batched output that includes a respective model output for each input in the batched input.

Generally, each input to the machine learning model and each model output generated by the machine learning model is a tensor. A tensor is a multidimensional array of numeric or other values, e.g., strings, having a specific order that corresponds to the dimensionality of the array. For example, a scalar value is a 0th-order tensor, a vector of numeric values is a 1st-order tensor, and a matrix is a 2nd-order tensor.

Depending on the configuration of the individual inputs, a batched input may be a single higher-order tensor made up of the individual tensors, or a single tensor that is of the same order as the individual tensors but that is a concatenation of the individual tensors. Given that the batched input is a single tensor, the corresponding batched output may also be a single tensor, and the model processing system 110 may track which portion of the single output tensor represents the model output for which individual input tensor.

To generate the batched inputs for processing by the model processing system 110, the machine learning system 100 also includes a batching system 130.

The batching system 130 maintains a queue for each machine learning model maintained by the model processing system 110, e.g., a queue 140A for the machine learning model 120A and, optionally, a queue 140N for the machine learning model 120N. Each queue includes inputs received for processing by the corresponding machine learning model.

When certain criteria are satisfied for the requests in a given queue, the batching system 130 generates a batched input from the inputs in the queue and provides the batched input to the model processing system 110 for processing by the corresponding machine learning model, e.g., provides a batched input 136 for processing by the machine learning model 120A. Generating a batched input is described below with reference to FIG. 2.

The model processing system 110 processes the batched input using the corresponding machine learning model to generate a batched output, e.g., a batched output 138 for the batched input 136 generated using the machine learning model 120A, and provides the batched output to the batching system 130.

The batching system 130 provides each individual model output included in the batched input as a response to the corresponding request. That is, the batching system 130 provides each individual model output as a response to the request that included in the input for which the model output was generated.

Generally, the model processing system 110 allocates one or more threads to processing the batched inputs generated by the batching system 130. In some cases, the threads are client threads that allow the batching system 130 to interface with the model processing system 110. In some other cases, the threads directly represent an allocation of hardware resources available to the model processing system 110 to the processing of a batched input.

In implementations where the batching system 130 manages queues for multiple machine learning models, when a thread becomes available, the batching system 130 selects a machine learning model and schedules a batched input to the selected machine learning model for processing by the available thread. Selecting a machine learning model is described in more detail below with reference to FIG. 3.

Figure 2:
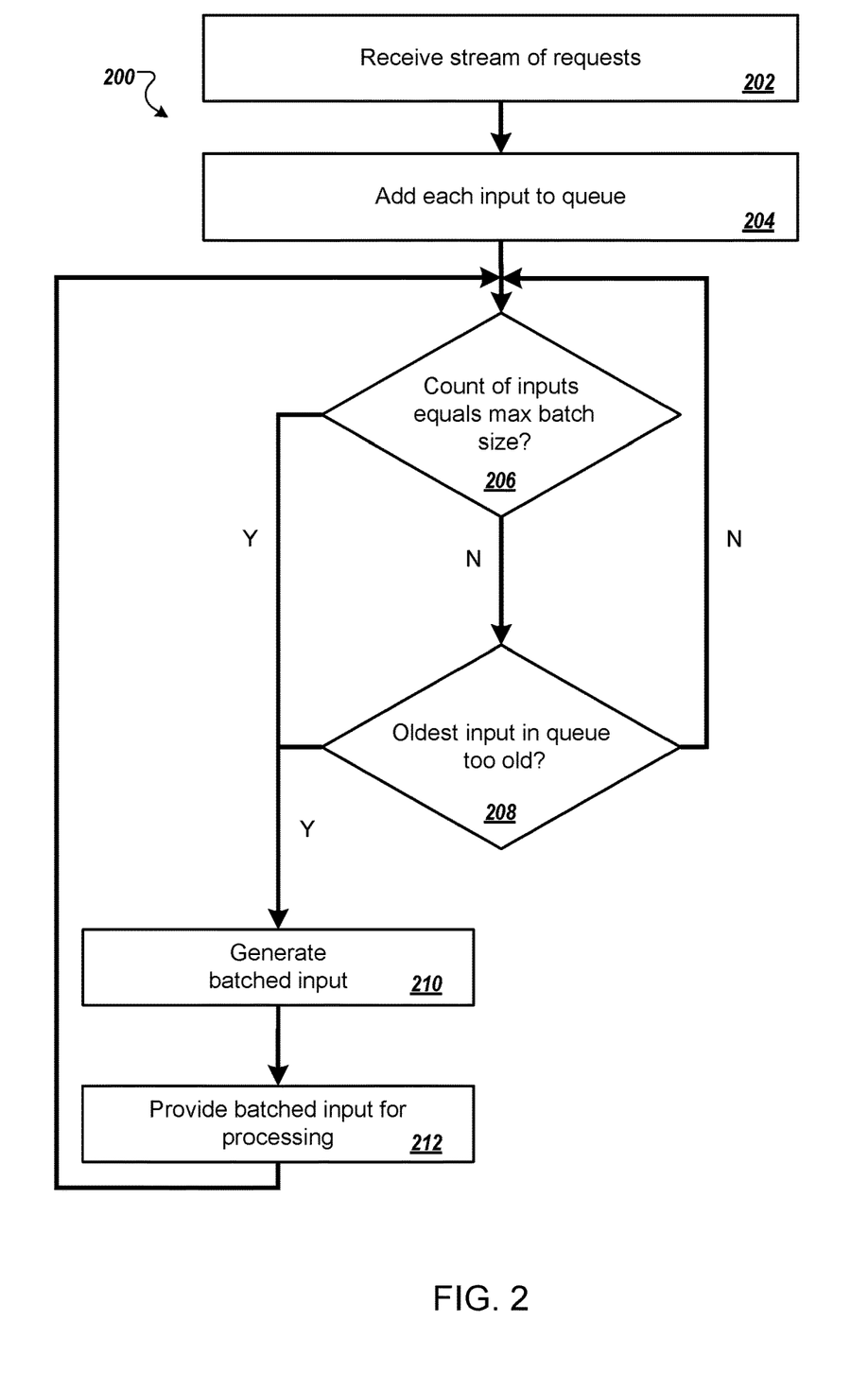
FIG. 2 is a flow diagram of an example process for batching inputs for processing by a machine learning model.

FIG. 2 is a flow diagram of an example process 200 for batching inputs for processing by a machine learning model. For convenience, the process 200 will be described as being performed by a system of one or more computers located in one or more locations. For example, a machine learning system, e.g., the machine learning system 100 of FIG. 1, appropriately programmed, can perform the process 200.

The system receives a stream of requests that each include an input for processing by a machine learning model (step 202).

The system adds each input to a queue of inputs for processing by the machine learning model (step 204). That is, the system maintains a queue that is specific to the machine learning model and that includes inputs to the machine learning model that are yet to be processed and adds each input to the machine learning model to the maintained queue.

At specified times, the system determines whether or not to generate a batched input from the inputs in the queue. For example, the system can determine whether or not to generate a batched input whenever a new input is added to the queue, whenever a specified number of inputs have been added to the queue since the last determination was made, or at specified time intervals.

In particular, to make the determination at each specified time, the system determines whether or not a count of inputs in the queue as of the specified time equals a maximum batch size (step 206).

In some implementations, the maximum batch size is specified by a system administrator or another entity. In other implementations, the system determines a maximum batch size for the machine learning model based on the architecture of the machine learning model and on characteristics of the available hardware resources. For example, the system can determine the maximum batch size to be the value that maximizes the throughput of the available hardware resources given the size of the tensors processed during processing of an input by the machine learning model.

If there are fewer inputs than the maximum batch size in the queue, the system determines whether an oldest input in the queue, i.e., the input that was added to the queue least recently, is too old (step 208). In particular, the system determines whether the oldest input in the queue is older than a latency parameter. Generally, the latency parameter is a value that is specified by a system administrator or other entity that defines how much latency is acceptable between the time a request is received by the system and the time that a response to the request is transmitted by the system.

If there are fewer inputs than the maximum batch size in the queue and the oldest input in the queue is not too old, the system refrains from generating a batched input and, at the next specified time, the system again determines whether or not to generate a batched input from the inputs in the queue, i.e., the system returns to performing step 206 at the next specified time.

If the count of inputs in the queue equals or exceeds the maximum batch size or if there are fewer inputs than the maximum batch size in the queue and the oldest input in the queue is not too old, the system generates a batched input from the inputs in the queue (step 210).

If the count of inputs in the queue equals or exceeds the maximum batch size, the system generates a batched input so that a count of inputs in the batched input equals the maximum batch size, i.e., generates a batched input that includes the N oldest inputs in the queue, where N is the maximum batch size.

If the count of inputs in the queue is less than the maximum value but the oldest input in the queue is too old, the system generates a batched input that includes all of the inputs in the queue but that has fewer inputs than the maximum batch size. By generating a batched input when the oldest input exceeds the latency parameter even though the count of inputs is less than the maximum batch size, the system can maintain an acceptable level of latency in processing inputs to the machine learning model.

In some implementations, the system generates a batched input that includes all of the inputs in the queue as of the specified time and treats the generated batched input as the final batched input to be processed by the machine learning model.

In some other implementations, the system modifies the generated batched input before it is processed. In particular, on some hardware platforms, each distinct batch size incurs resources, e.g., compilation time for the model and/or memory to store the compiled model. To account for this, in these implementations, the system maintains data identifying multiple acceptable batch sizes that are smaller than the maximum size, and each batched input processed by the machine learning model has a size that equals either the maximum batch size or one of the acceptable batch sizes. By only generating batches that have one of the acceptable batch sizes or the maximum batch size, the resources used by the system can be reduced while still ensuring an acceptable latency.

In these implementations, the system determines whether the count of inputs in the generated batched input is between two acceptable batch sizes, i.e., is more than a first acceptable batch size and less than a second acceptable batch size, rather than being equal to any of the acceptable batch sizes. If it is, the system adds placeholder inputs to the batched input so that the count of inputs in the batched input equals the second acceptable batch size. The placeholder inputs may be, e.g., copies of inputs from the queue that are already included in the generated batched input. For example, the system may select an input at random from the inputs in the batched input and copy that input until the count of inputs in the batched input equals the second acceptable batch size.

Once the system has generated the batched input, the system provides the batched input for processing by the machine learning model (step 212).

After the batched input has been processed using the machine learning model to generate a respective model output for each individual input in the batched input, the system provides the model outputs in response to the corresponding requests. In cases where the system added placeholder inputs to the batched input, the system discards the model outputs generated for the placeholder inputs.

As described above, in some implementations the system maintains a respective queue for each of multiple machine learning models.

For example, the system may maintain multiple models to accommodate rolling upgrades to a maintained model, i.e. a model that starts with version 1, and then gets upgraded to version 2, and so on over time. Each version may have parameters that have been adjusted to better match the latest training data. While upgrading from version i to i+1, some requests received by the system may be intended for version i while other requests may already be intended for version i+1. To account for this, the system serves requests for both versions simultaneously.

Each of the maintained models may have one or more of different maximum batch sizes, different acceptable batch sizes, or different latency parameters from the other maintained models.

The model processing system that manages the processing of inputs by the machine learning models may allocate one or more client threads or one or more processing threads for processing of batched inputs generated by the system. In these implementations, the system schedules batched inputs from the multiple queues for processing and provides the next scheduled batch input when a thread becomes available.

Figure 3:
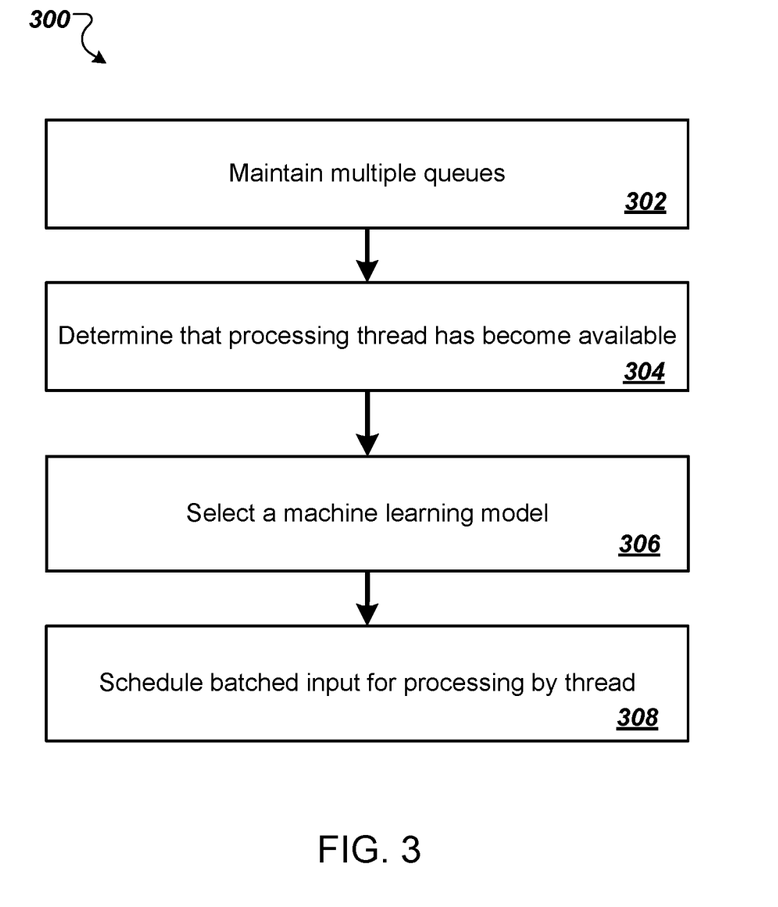
FIG. 3 is a flow diagram of an example process for maintaining a respective queue for each of multiple machine learning models.

FIG. 3 is a flow diagram of an example process 300 for maintaining a respective queue for each of multiple machine learning models. For convenience, the process 300 will be described as being performed by a system of one or more computers located in one or more locations. For example, a machine learning system, e.g., the machine learning system 100 of FIG. 1, appropriately programmed, can perform the process 300.

The system maintains a respective queue for each of multiple machine learning models (step 302). That is, each queue includes only inputs to be processed by the corresponding machine learning model and not inputs to be processed by other machine learning models maintained by the system.

The system determines that a thread has become available for processing a batched input (step 304). That is, the system determines that a thread allocated for processing batched inputs generated by the system has become available for processing a new batched input.

The system selects one of the multiple machine learning models (step 306) and provides a batched input from the queue for the selected machine learning model for processing using the thread (step 308).

The system can select a machine learning model in any of a variety of ways.

For example, in some implementations, the system allows each of the machine learning models equal access to the threads that are made available to the system. In these implementations, the system can schedule batched inputs on available threads using round robin scheduling or another scheduling algorithm that gives equal access to each maintained machine learning model.

In some other implementations, however, certain machine learning models are given priority over other machine learning models maintained by the system. In these implementations, the system can select the machine learning model using a scheduling scheme that selects the prioritized machine learning models more frequently than the other maintained machine learning models. For example, if the system maintains a model A and a model B, the system may schedule batched inputs as follows: AABAABAAB, and so on, i.e., so that model A is selected twice as frequently as model B.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving a stream of requests, each request identifying a respective input tensor for processing by a machine learning model in a plurality of machine learning models, wherein each identified input tensor comprises respective input values and has a number of dimensions;
   adding the respective input tensor from each request to a queue of input tensors for processing by the machine learning model, wherein each machine learning model in the plurality of machine learning models is configured to receive a fixed-size input tensor that is a combination of a fixed number of tensors having the number of dimensions;
   determining, at a first time, that a count of input tensors in the queue of input tensors for processing by the machine learning model, as of the first time, is at least equal to the fixed number of tensors and in response:
      generating a first batched input tensor from input tensors in the queue as of the first time comprising adding input tensors to the first batched input tensor until the first batched input tensor comprises a number of input tensors equal to the fixed number of tensors, and
      providing the first batched input tensor for processing by the machine learning model to a computing device configured to execute the machine learning model; and
   determining, at a second time, that (i) a count of input tensors in the queue as of the second time is less than the fixed number of tensors and (ii) that an oldest input tensor in the queue is older than a respective latency parameter for the machine learning model, and in response:
      generating a second batched input tensor from the input tensors in the queue as of the second time, comprising adding each input tensor in the queue to the second batched input tensor, and adding placeholder tensors having the number of dimensions to the second batched input tensor until the second batched input tensor comprises a number of tensors equal to the fixed number of tensors, and
      providing the second batched input tensor for processing by the machine learning model to the computing device configured to execute the machine learning model.

2. The method of claim 1, wherein each placeholder input is a copy of a respective input tensor in the queue.

3. The method of claim 1, further comprising:
   receiving a second machine learning output generated by the machine learning model for the second batched input tensor;
   determining, for each input tensor having the number of dimensions in the second batched input tensor, a respective portion of the second machine learning output that corresponds to the input tensor;
   for each placeholder tensor in the second batched input tensor, discarding the respective portion of the second machine learning output that corresponds to the placeholder tensor; and
   providing a respective portion of the second machine learning output corresponding to each input tensor in the second batched input tensor that is not a placeholder tensor.

4. The method of claim 1,
   wherein processing by the first machine learning model is managed by a computational graph system that represents operations of the machine learning model during processing of a given batched input tensor as a computational graph,
   wherein the computational graph comprises a plurality of nodes and directed edges,
   wherein each node represents a respective operation, and
   wherein each directed edge connects a respective first node to a respective second node that represents an operation that receives, as an input tensor, an output tensor of an operation represented by the respective first node.

5. The method of claim 4, wherein the computational graph system processes batched input tensors by assigning the operations of the machine learning model represented by the nodes in the computational graph among a plurality of computing devices.

6. The method of claim 4, wherein providing the first batched input tensor for processing by the machine learning model comprises providing the first batched input tensor to the computational graph system, and wherein providing the second batched input tensor for processing by the machine learning model comprises providing the second batched input tensor to the computational graph system.

7. The method of claim 1, further comprising:
processing each machine learning model of the plurality of machine learning models on a respective device of a plurality of computing devices;
adding input tensors to queues of machine learning models based on availability of respective computing devices processing the models to process the input tensors.

8. The method of claim 1, further comprising:
receiving a first batched output tensor from the machine learning model, wherein the first batched output tensor comprises respective output values corresponding to the respective input values for each input tensor; and
generating, from the first batched output tensor, a plurality of output tensors, each output tensor comprising respective output values corresponding to a respective identified input tensor.

9. The method of claim 1, wherein the machine learning model further specifies a plurality of acceptable numbers of tensors, each acceptable number less than the fixed number of tensors, and wherein the method further comprises:
determining at the second time (i) that the count of input tensors in the queue as of the second time is less than the fixed number of tensors, (ii) that the oldest input tensor in the queue is older than the respective latency parameter for the machine learning model, and (iii) that the count of input tensors in the queue is between a first acceptable number and a second acceptable number of tensors of the plurality of acceptable numbers of tensors, wherein the second acceptable number of tensors is larger than the first acceptable number, and in response,
generating a third batched input tensor from the input tensors, comprising adding each input tensor in the queue to the third batched input tensor, and adding placeholder tensors having the number of dimensions to the third batched input tensor until the third batched input tensor comprises a number of tensors equal to the second acceptable number of tensors, and
providing the third batched input tensor for processing by the machine learning model to the computing device configured to execute the machine learning model.

10. A system comprising one or more computers and one or more storage devices storing instructions that, when executed by the one or more computers, cause the one or more computers to perform operations comprising:
receiving a stream of requests, each request identifying a respective input tensor for processing by a first machine learning model in a plurality of machine learning models, wherein each identified input tensor comprises respective input values and has a number of dimensions;
adding the respective input tensor from each request to a queue of input tensors for processing by the machine learning model, wherein each machine learning model in the plurality of machine learning models is configured to receive a fixed-size input tensor that is a combination of a fixed number of tensors having the number of dimensions;
determining, at a first time, that a count of input tensors in the queue of input tensors for processing by the machine learning model, as of the first time, is at least equal to the fixed number of tensors and in response:
generating a first batched input tensor from input tensors in the queue as of the first time comprising adding input tensors to the first batched input tensor until the first batched input tensor comprises a number of input tensors equal to the fixed number of tensors, and
providing the first batched input tensor for processing by the machine learning model to a computing device configured to execute the machine learning model; and
determining, at a second time, that (i) a count of input tensors in the queue as of the second time is less than the fixed number of tensors and (ii) that an oldest input tensor in the queue is older than a respective latency parameter for the machine learning model, and in response:
generating a second batched input tensor from the input tensors in the queue as of the second time, comprising adding each input tensor in the queue to the second batched input tensor, and adding placeholder tensors having the number of dimensions to the second batched input tensor until the second batched input tensor comprises a number of tensors equal to the fixed number of tensors, and
providing the second batched input tensor for processing by the machine learning model to the computing device configured to execute the machine learning model.

11. The system of claim 10, wherein each placeholder input is a copy of a respective input tensor in the queue.

12. The system of claim 10, the operations further comprising:
receiving a second machine learning output generated by the machine learning model for the second batched input tensor;
determining, for each input tensor having the number of dimensions in the second batched input tensor, a respective portion of the second machine learning output that corresponds to the input tensor;
for each placeholder tensor in the second batched input tensor, discarding the respective portion of the second machine learning output that corresponds to the placeholder tensor; and
providing a respective portion of the second machine learning output correspond to each input in the second batched input tensor that is not a placeholder tensor.

13. The system of claim 10,
wherein processing by the machine learning model is managed by a computational graph system that represents operations of the machine learning model during processing of a given batched input tensor as a computational graph,
wherein the computational graph comprises a plurality of nodes and directed edges,
wherein each node represents a respective operation, and
wherein each directed edge connects a respective first node to a respective second node that represents an operation that receives, as an input tensor, an output tensor of an operation represented by the respective first node.

14. The system of claim 13, wherein the computational graph system processes batched input tensors by assigning the operations of the machine learning model represented by the nodes in the computational graph among a plurality of computing devices.

15. The system of claim 13, wherein providing the first batched input tensor for processing by the machine learning model comprises providing the first batched input tensor to the computational graph system, and wherein providing the second batched input tensor for processing by the machine learning model comprises providing the second batched input tensor to the computational graph system.

16. The system of claim 10, the operations further comprising:
processing each machine learning model of the plurality of machine learning models on a respective device of a plurality of computing devices;
adding input tensors to queues of machine learning models based on availability of respective computing devices processing the models to process the input tensors.

17. The system of claim 16, wherein the machine learning model is a first machine learning model, and wherein a second machine learning models in the plurality of machine learning models is a different version of the first machine learning model.

18. The system of claim 10, wherein the operations further comprise:
receiving a first batched output tensor from the machine learning model, wherein the first batched output tensor comprises respective output values corresponding to respective input values for each input tensor; and
generating, from the first batched output tensor, a plurality of output tensors, each output tensor comprising respective output values corresponding to a respective identified input tensor.

19. One or more non-transitory computer storage media storing instructions that when executed by one or more computers, cause the one or more computers to perform operations comprising:
receiving a stream of requests, each request identifying a respective input tensor for processing by a machine learning model in a plurality of machine learning models, wherein each identified input tensor comprises respective input values and has a number of dimensions;
adding the respective input tensor from each request to a queue of input tensors for processing by the machine learning model, wherein each machine learning model in the plurality of machine learning models is configured to receive a fixed-size input tensor that is a combination of a fixed number of tensors having the number of dimensions;
determining, at a first time, that a count of input tensors in the queue of input tensors for processing by the machine learning model, as of the first time, is at least equal to the fixed number of tensors; and in response:
generating a first batched input tensor from input tensors in the queue as of the first time comprising adding input tensors to the first batched input tensor until the first batched input tensor comprises a number of input tensors equal to the fixed number of tensors, and
providing the first batched input tensor for processing by the machine learning model to a computing device configured to execute the machine learning model; and
determining, at a second time, that (i) a count of input tensors in the queue as of the second time is less than the fixed number of tensors and (ii) that an oldest input tensor in the queue is older than a respective latency parameter for the machine learning model, and in response:
generating a second batched input tensor from the input tensors in the queue as of the second time, comprising adding each input tensor in the queue to the second batched input tensor, and adding placeholder tensors having the number of dimensions to the second batched input tensor until the second batched input tensor comprises a number of tensors equal to the fixed number of tensors, and
providing the second batched input tensor for processing by the machine learning model to the computing device configured to execute the machine learning model.

20. The computer storage media of claim 19, wherein the operations further comprise:
receiving a first batched output tensor from the machine learning model, wherein the first batched output tensor comprises respective output values corresponding to respective input values for each input tensor; and
generating, from the first batched output tensor, a plurality of output tensors, each output tensor comprising respective output values corresponding to a respective identified input tensor.

* * * * *

UNITED STATES PATENT AND TRADEMARK OFFICE
CERTIFICATE OF CORRECTION

PATENT NO. : 10,789,544 B2  
APPLICATION NO. : 15/091381  
DATED : September 29, 2020  
INVENTOR(S) : Fiedel et al.

Page 1 of 1

It is certified that error appears in the above-identified patent and that said Letters Patent is hereby corrected as shown below:

On the Title Page

The first or sole Notice should read --

Subject to any disclaimer, the term of this patent is extended or adjusted under 35 U.S.C. 154(b) by 775 days.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*